United States Patent
Borbely (12)

(10) Patent No.: US 6,326,511 B1
(45) Date of Patent: Dec. 4, 2001

(54) POLYMERIC PRODUCT

(75) Inventor: Janos Borbely, Debrecen (HU)

(73) Assignee: Lajos Kossuth University, Debrecen (HU)

( * ) Notice: Subject to any disclaimer, the term of this patent is extended or adjusted under 35 U.S.C. 154(b) by 0 days.

(21) Appl. No.: 09/135,635

(22) Filed: Aug. 17, 1998

Related U.S. Application Data

(60) Provisional application No. 60/056,344, filed on Aug. 18, 1997.

(51) Int. Cl.[7] .................. C07C 229/00; C08G 69/08; C08G 69/10; A61K 47/30
(52) U.S. Cl. .................. 560/171; 530/350; 528/310; 528/328; 514/772.2
(58) Field of Search .................. 560/171; 528/310, 528/328; 514/772.2; 530/350

(56) References Cited

U.S. PATENT DOCUMENTS

| | | | |
|---|---|---|---|
| 3,719,520 | * | 3/1973 | Fujimoto et al. . |
| 5,118,784 | * | 6/1992 | Kubota et al. . |
| 5,378,807 | * | 1/1995 | Gross et al. . |
| 5,461,085 | * | 10/1995 | Nagamoto et al. . |

* cited by examiner

*Primary Examiner*—Thurman K. Page
*Assistant Examiner*—Amy E Pulliam
(74) *Attorney, Agent, or Firm*—Donald J. Perrella

(57) ABSTRACT

Methods are disclosed for preparing partial and complete esters of poly-γ-glutamic acid, and of the cross-linking of such esters by light of predetermined wavelength. The final products of the present invention are useful in local drug delivery in depot form, for guided tissue regeneration, and for inhibition of post-surgical adhesion.

15 Claims, No Drawings

POLYMERIC PRODUCT

This application claims the benefit of U.S. Provisional Application Ser. No. 60/056,344, filed Aug. 18, 1997.

The present invention relates to alkyl and/or alkylene esters of poly-γ-glutamic acid (PGA). More particularly, it relates to alkyl and/or alkylene esters of poly-γ-glutamic acid (PGA) that are cross-linked by exposure to light of predetermined, specified wavelength.

SUMMARY OF THE INVENTION

The present invention relates to alkyl and/or alkylene esters of poly-γ-glutamic acid (PGA) that are prepared by esterifying PGA with a labile alkyl or alkylene group, methods for the preparation of such esters, and of their cross-linking upon exposure to light of predetermined, specified wavelength to form hydrophilic gels.

DESCRIPTION OF PRIOR PUBLICATIONS RELATING TO GLUTAMIC ACID

British Patent 1,099,227 discloses plasticized polymeric compositions comprising a major proportion of a normally solid polymer of (A) vinyl chloride or vinyl acetate or a mixture of the two, and (B) a polymer prepared by reacting glutamic acid with an alcohol of formula $RCH_2OH$ wherein R is phenyl or a $C_{5-21}$ alkyl radical.

U.S. Pat. No. 3,933,492 discloses photoconductive substances of the formula

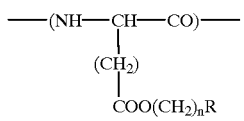

wherein R is a polynuclear or a heterocyclic nitrogen group, each containing up to 16 carbon atoms, and n is 1 or 2.

U.S. Pat. No. 4,450,150 discloses an implantable drug delivery depot comprising a copolymer of glutamic acid and glutamic acid ethyl ester having one or more drug or diagnostic agents physically contained therein.

DETAILED DESCRIPTION

The starting material of the present invention is poly-γ-glutamic acid which is most conveniently prepared by fermentation of a suitable microrganism capable of producing poly-γ-glutamic acid in a suitable fermentation medium for times and under conditions and time appropriate for the organism used. Agar containing yeast extract (typically 0.5%) is a suitable nutrient substrate. Culture plates (nutrient agar with about 0.5% yeast extract) are inoculated with an organism capable of producing poly-γ-glutamic acid, preferably with a spore suspension of the microorganism, and incubated at a suitable temperature. A preferred organism is *Bacillus licheniformis* (ATCC 9945a). Colonies are selected and used to inoculate the fementation medium which is incubated at suitable conditions of temperature, agitation and time, typically, about 37° C. on an orbit shaker (about 100–200 rpm) for 24–72 hours. Medium E is a suitable fermentation medium. The resulting suspension is used as a seed to inoculate a 2-liter flask which is incubated on the shaker for an appropriate time, generally from about 2 to about 10 days.

The resulting culture medium is treated, e.g. by centrifugation, filtration, or other suitable means, to separate the cells from the poly-γ-glutamic acid and the resulting cell-free liquid is treated to yield the desired poly-γ-glutamic acid in purified form as the free acid, e.g. by addition of an alkanol of from 1 to 4 carbons, preferably, ethanol or methanol. The molecular weight ($M_w$) of the PGA free acid product is from about $0.5 \times 10^6$ to about $1.5 \times 10^6$.

The free acid product is then partially esterified by reaction with a $C_{2-20}$ alkenyl halide, or acetate, preferably a $C_2$–$C_6$ alkenyl halide or acetate, and most preferably with vinyl bromide or vinyl acetate. This reaction takes place in a polar solvent, e.g. dimethyl sulfoxide (DMSO), dimethyl formamide (DMF), dimethyl acetamide (DMA), or their equivalents, in the presence of a base such as $NAHCO_3$, $Na_2CO_3$, $KHCO_3$, $K_2CO_3$, or their equivalents, and mixtures thereof, preferably using a molar excess of the base. The degree of esterification is monitored by NMR measurements, using 200 MHz for $^1H$ and the reaction is terminated when up to about 30%, preferably from about 20% to about 30%, of the carboxyl groups of the PGA have been esterified.

This partial ester product then can then be further esterified by repeating the foregoing treatment with the alkyl or alkenyl compound whereby the extent of esterification is increased to up to about 60%, preferably from about 50% to about 60%.

The second esterification product can itself be further esterified by repeating the foregoing treatment with the alkyl and/or alkenyl halide whereby the extent of esterification is increased to about 99%, preferably from about 90% to about 98%. Any of the three esterification products can be cross-linked by addition of an initiator such as, for example, benzoin methyl ether, or another light initiator as a catalyst, and exposure to light having a wavelength of from about 226 nm to about 460 nm. More preferably, the light is (1) ultra-violet (UV) light having a wave length of from about 246 to about 266 nm, most preferably about 256 nm, or (2) low energy UV light having a wave length of from about 350 nm to about 370 nm, most preferably about 360 nm, or (3) blue visible light having a wave length of from about 410 nm to about 430 nm, most preferably about 420 nm.

The final products of the present invention are useful in local drug delivery in depot form, for guided tissue regeneration, and for inhibition of post-surgical adhesion. For these applications, they are used similarly to agents known to be effective for such applications.

The following examples illustrate the present invention without, however, limiting the same thereto.

EXAMPLE 1

Preparation of Poly-γ-Glutamic Acid

A solution of Medium E was prepared by dissolving the following ingredients in 1 liter of distilled water.

| | |
|---|---|
| L-glutamic acid | 20 g |
| citric acid | 12 g |
| glycerol | 80 g |
| $NH_4Cl$ | 7 g |
| $K_2HPO_4$ | 0.5 g |
| $MgSO_4.7H_2O$ | 0.5 g |
| $FeCl_3.6H_2O$ | 0.04 g |
| $CaCl_2.2H_2O$ | 0.15 g |
| $MnSO_4.H_2O$ | 0.08 g |

The pH was adjusted to 7.4 with NaOH and the medium was autoclaved at 121° C. at 15 psig for 20 minutes.

Culture plates (nutrient agar with 0.5% yeast extract) were inoculated with a spore suspension of *Bacillus licheformis* (ATCC 9945a) and incubated overnight at 37° C. A highly mucoid colony was used to inoculate a 50 ml aliquot of the medium E, and the inoculated aliquot was incubated at 37° C. on an orbit shaker (150 rpm) for 48 hours. The resulting suspension was used as a seed to inoculate a 2-liter flask which was incubated on the shaker (150 rpm) for five days.

The contents of the culture flask were centrifuged (Sorvall RC-5B, 8000 g, 4° C., 40 minutes) to separate the cells from the polymer solution. Two and one-half volumes of cold 95% ethanol were added slowly to the supernatant liquid while stirring. After standing overnight in the refrigerator the liquid was decanted and the precipitated polymer was dissolved in distilled water. The resulting polymer solution was dialysed against 4 volumes of distilled water, concentrated and freeze dried to yield the title compound as the free acid.

The molecular weight ($M_w$), as determined by Gel Permeation Chromatography, using a Waters E LC apparatus (column: ASAHIPAK GSM-700, 7.5 mm i.d. and 500 mm length); eluant 50 mM phosphate buffer solution (pH=7) with 100 mM NaCl; flow rate: 1 ml/min., was in the range of $0.8 \times 10^6$ to $1.2 \times 10^6$.

EXAMPLE 2

Partial Esterification of PGA

To a 2% solution of 5 g of the free acid polymeric product from Example 1 in DMSO, a two molar excess of $NaHCO_3$ and a five molar excess of ethylene bromide was added. The resulting suspension was stirred and allowed to stand at ambient temperature for 24 hours. Samples were taken at various times and were precipitated in ether containing 1% methanol. After 24 hours the precipitate was washed with acetone and dried in vacuo. At the end of this partial esterification reaction, about 25% the carboxyl groups were esterified as determined by NMR, using 200 MHz for $^1H$ and 75.4 MHz operation frequency for $^{13}C$.

Similar results are obtained when alkenyl groups n-butylene-1, octylene-1, and octadecylene-1 are substituted, respectively, for ethylene.

EXAMPLE 3

Further Esterification of Product of Example 2

The dried, partly esterified ethylene ester product from Example 2, 5 g, was reacted a second time and third time under the same conditions as in Example 2. The reactions were allowed to continue for approximately 12 hours. After the third esterification, the polymer was precipitated in 10 volumes of aqueous HCl (pH=2). The precipitates were filtered, washed sequentially in water, acetone and hexane, and further purified by Soxhlet extraction with toluene and dried in vacuo. The degree of esterification after the second cycle was from about 64 to about 66 mole %; and after the third cycle, the degree of esterification was from about 98 to about 99 mole %.

The foregoing steps are repeated with the n-butylene-1, octylene-1, and octadecylene-1 esters, respectively, of example 2, and also with the ethyl, butyl, octyl and octadecyl esters, respectively, of example 2, with similar results.

EXAMPLE 4

Preparation of Partial Vinyl Ester of PGA

To a 2% w/w solution of 5 g of the product of Example 1 in DMSO there were added a two molar excess of vinyl acetate and a drop of anhydrous sulphuric acid. The mixture was kept at ambient temperature. Samples were taken at 4, 12 and 24 hours after which the the product was precipitated in ether containing 1% methanol. The precipitate was washed with acetone and dried in vacuo. The conversion was detected by NMR spectroscopy. The intensity of signals of vinyl protons in the vinyl ester groups at 5–7 ppm (1v) and that of the α-proton of glutamic acid moiety at 4–4.5 ppm (1a) gives the ratio of free acidic groups and partial vinyl esters as is shown in the following Table.

| Relationship between degree of esterification and ratio of NMR signals | | |
|---|---|---|
| Cycle | Degree of Esterification (mole %) | Ratio of NMR signals (1a/1v) |
| 1st | 5 | 1/60 |
| 2nd | 10 | 1/30 |
| 3rd | 25 | 1/12 |

EXAMPLE 5

Polymerization of Partial Vinyl Ester of PGA

To a 50% w/w solution of the product of Example 4 there was added 1% of benzoin methyl ether. The solution was exposed to blue light (420 nm) light whereby the liquid was converted to a gel. The gel showed irreversible properties, e.g. no organosol phase was obtained when heated.

Similar results are obtained when wavelengths of 360 nm or 256 nm are used in place of the blue light.

A small amount, 5 ml, of another 50% w/w solution of the product of Example 3 was poured on a glass surface measuring 5 cm by 5 cm to form a 1 mm thick film. The film was exposed to the same blue light to form a stable polymeric surface which was insoluble in water, demonstrating the formation of a polymeric network.

What is claimed is:

1. A poly-γ-glutamic acid, esterified up to about 99% at the γ-carboxylic group with a $C_{2-20}$ group containing an unsaturated bond, and optionally containing an acetate or halide group, the ester being formed from an unesterified poly-γ-glutamic acid having a molecular weight of from about $0.5 \times 10^6$ to about $1.5 \times 10^6$, the poly-γ-glutamic acid being cross-linked by reaction between double bonds on different $C_{2-20}$ ester groups by exposure to light having a wavelength of from about 226 nm to about 460 nm.

2. The cross-linked ester of claim 1 wherein at least about 10% of the carboxyl groups are esterified.

3. The cross-linked ester of claim 1 wherein at least about 30% of the carboxyl groups are esterified.

4. The cross-linked ester of claim 1 wherein at least about 60% of the carboxyl groups are esterified.

5. The cross-linked ester of claim 1 wherein at least about 90% of the carboxyl groups are esterified.

6. The cross-linked ester of claim 1 wherein the cross-linking is effected by exposure to ultraviolet light having a wavelength of from about 246 nm to about 266 nm.

7. The cross-linked ester of claim 1 wherein the cross-linking is effected by exposure to low energy ultraviolet light having a wavelength of from about 350 nm to about 370 nm.

8. The cross-linked ester of claim 1 wherein the cross-linking is effected by exposure to visible blue light having a wavelength of from about 410 nm to about 430 nm.

9. A process for producing a cross-linked, esterified up to about 99% ester of poly-γ-glutamic acid comprising esterifying a poly-γ-glutamic free acid having a molecular weight of from about $0.5 \times 10^6$ to about $1.5 \times 10^6$ with a $C_{2-20}$ group containing an unsaturated bond and optionally containing an acetate or halide group, for a time sufficient to esterify from about 10% to about 99% of the poly-γ-glutamic free acid, and cross-linking the poly-γ-glutamic acid ester by exposing it to light having a wavelength of from about 226 nm to about 460 nm.

10. The process of claim 9 wherein the esterificaton reaction takes place in the presence of a polar solvent for a time sufficient to effect the desired degree of esterification.

11. The process of claim 9 wherein the $C_{2-20}$ group is a vinyl halide or a vinyl acetate.

12. The process of claim 9 wherein the cross-linking is effected by exposure to low energy ultraviolet light having a wavelength of from about 246 nm to about 266 nm.

13. The process of claim 9 wherein the cross-linking is effected by exposure to low energy ultraviolet light having a wavelength of from about 350 nm to about 370 nm.

14. The process of claim 9 wherein the crosslinking is effected by exposure to visible blue light having a wavelength of from about 410 nm to about 430 nm.

15. The process of claim 10 wherein the polar solvent is dimethyl sulfoxide, dimethyl formamide, or dimethyl acetamide.

* * * * *